United States Patent [19]

Ritz

[11] Patent Number: 4,645,640
[45] Date of Patent: Feb. 24, 1987

[54] REFUELING SYSTEM WITH SMALL DIAMETER ROTATABLE PLUGS

[75] Inventor: William C. Ritz, Greensburg, Pa.

[73] Assignee: Westinghouse Electric Corp., Pittsburgh, Pa.

[21] Appl. No.: 578,337

[22] Filed: Feb. 9, 1984

[51] Int. Cl.$^4$ .............................................. G21C 19/20
[52] U.S. Cl. ................... 376/264; 376/268; 376/353; 376/460
[58] Field of Search ............... 376/206, 460, 271, 264, 376/268, 269, 272, 290, 261, 353

[56] References Cited

U.S. PATENT DOCUMENTS

| | | | |
|---|---|---|---|
| 3,635,792 | 1/1972 | Barker | 376/271 |
| 3,773,616 | 11/1973 | Aubert | 376/460 |
| 3,841,964 | 10/1974 | Dumayne | 376/271 |
| 3,862,001 | 1/1975 | Marmonier et al. | 376/460 |
| 3,948,724 | 4/1976 | Rothfuss | 376/271 |
| 4,071,402 | 1/1978 | Wade | 376/206 X |
| 4,142,935 | 3/1979 | Wade | 376/271 |

Primary Examiner—Deborah L. Kyle
Assistant Examiner—Dan Wasil
Attorney, Agent, or Firm—Joel Petrow

[57] ABSTRACT

A nuclear reactor refueling system for a liquid metal-cooled fast breeder reactor includes a large rotatable plug (18) eccentrically mounted relative to the reactor core (12), and a small rotatable plug (24) mounted within the large plug (18). A fuel handling machine (28) is rotatably mounted upon the small plug (24), and the eccentric mounting of the large plug (18) permits the fuel handling machine (28) to access all areas of the reactor core (12) as well as a fuel transfer station or port (34) located externally of the reactor core barrel (16) yet internally of the reactor pressure vessel. A unique six-fingered star-shaped upper internals structure (36) is eccentrically mounted upon the large plug (18) so as to be concentrically disposed relative to the core (12) when the reactor is in operation yet permitting access to the central-most fuel assemblies (14) of the core (12) as the large rotatable plug (18) is rotated during refueling operations. The uniquely configured upper internals structure (36), as well as the eccentric mounting of the large plug (18) relative to the core barrel (16) and the provision of the small plug (24) eccentrically mounted upon the large plug (18) permits the diametrical extent of the large plug (18) to be precisely the same as that of the core barrel (16).

3 Claims, 1 Drawing Figure

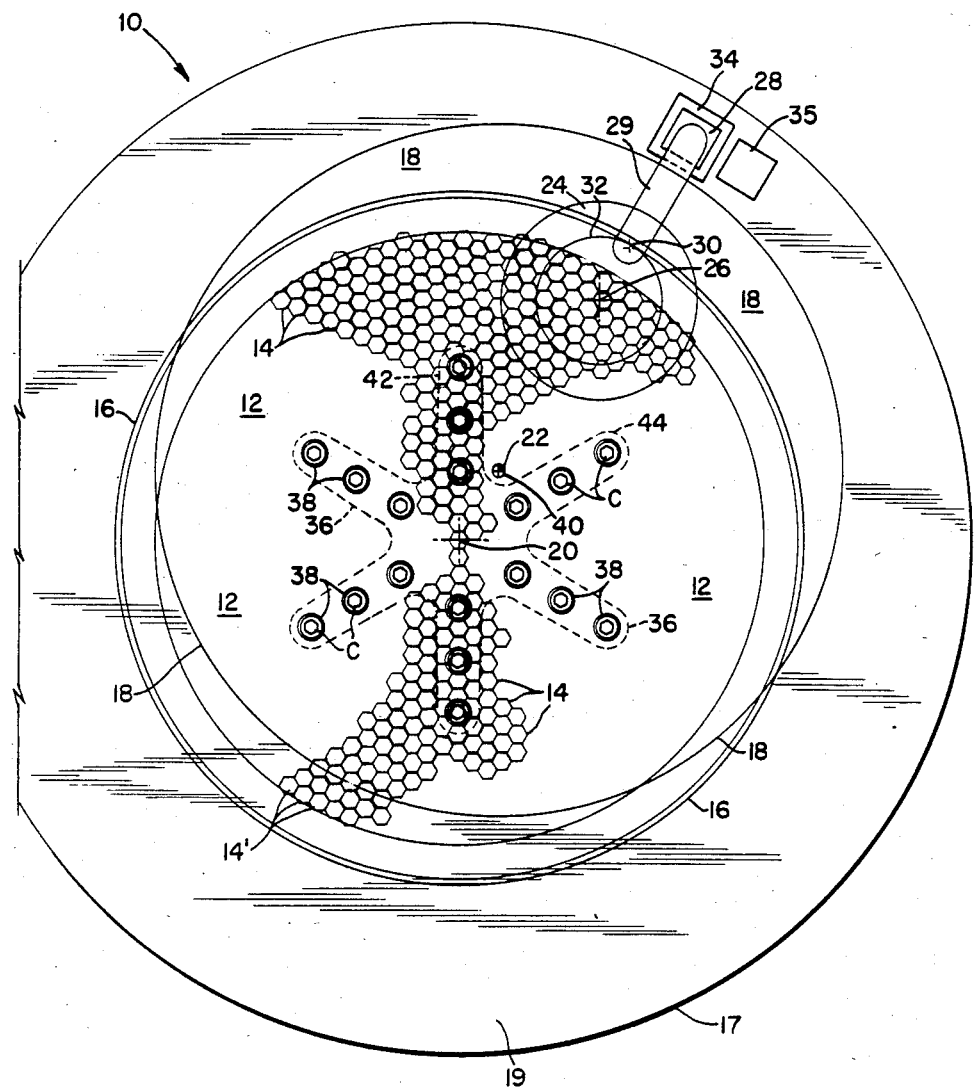

REFUELING SYSTEM WITH SMALL DIAMETER ROTATABLE PLUGS

BACKGROUND OF THE INVENTION

1. Field of the Invention

The present invention relates generally to nuclear reactor facilities, and more particularly to a refueling system for use within a liquid metal fast breeder reactor (LMFBR) wherein the refueling system facilitates the reduction in the diametrical extent or size of the closure head large plug so as to be the same as that of the core barrel, while additionally facilitating the transfer of fuel at a station which is located externally of the core barrel yet internally of the reactor vessel, all of the aforenoted also being accomplished without deleteriously affecting the structural integrity of the upper internals structure (UIS) of the facility.

2. Description of the Prior Art

A nuclear reactor produces heat as a result of the fission of nuclear material which is disposed within fuel rods, the fuel rods being secured together so as to define fuel assemblies. The fuel assemblies define the nuclear reactor core, and the core is disposed within a reactor or pressure vessel. In commercial nuclear reactor facilities, the heat produced by means of the fission process is used to generate electricity. Accordingly, conventional facilities usually comprise one or more primary flow and heat transfer loops, and a corresponding number of secondary flow and heat transfer loops to which conventional steam turbines and electrical generators are fluidically connected. A typical energy conversion process for such commercial nuclear reactor facilities would therefore comprise the transfer of heat from the nuclear core to the primary coolant flow system, from the primary coolant flow system to the secondary coolant flow system, and finally from the secondary coolant flow system to the steam turbines, and the electrical generators operatively connected thereto, from which the electricity is ultimately generated.

In a liquid cooled nuclear reactor, such as, for example, a liquid metal-cooled fast breeder reactor (LMFBR), a reactor coolant, such as, for example, liquid sodium, is circulated through the primary coolant flow system which typically comprises the nuclear core, a heat exchanger, and a circulating pump. In nuclear reactors having more than one primary coolant flow loop within the primary coolant flow system, the nuclear core and the reactor pressure vessel, within which the nuclear core is disposed, are connected in common to each of the primary coolant flow loops. The heat generated by means of the nuclear core is thus removed by means of the reactor coolant which is conducted into the reactor vessel and through the reactor core. The heated reactor coolant then exits from the nuclear core and the reactor vessel so as to flow through the heat exchangers which serve to transfer the heat to the secondary flow system associated therewith. The cooled reactor coolant then exits from the heat exchangers and is recirculated back to the reactor pressure vessel by means of the circulating pump, whereby the aforenoted flow cycle is repeated.

The nuclear reactor pressure vessel is sealed at the top portion thereof by means of a cover or closure head, and in fast-neutron energy reactors, such as, for example, a liquid metal-cooled breeder reactor, it is imperative that the closure head include one or more rotatable structural members or plugs. By suitable rotation of these plugs, it is possible for the instrumentation, control, and handling equipment mounted upon or operatively associated with the plugs to be selectively positioned above all desired locations of the nuclear core. In this manner, it is possible to achieve underthe-head or under-the-plug refueling, or in other words, refueling of the nuclear core while the closure head is maintained in its sealed mode atop the pressure vessel and core. This is of course mandatory in connection with liquid metal fast breeder reactors, as such is not in connection with, for example, pressurized water reactors, in view of the explosive instability of the liquid metal coolant in the presence of an ordinary atmospheric environment as would be the case should the closure head be removed for the refueling operation.

In liquid metal-cooled fast breeder reactors, it is also required that a positive top core holddown structure be provided in order to maintain the fuel assemblies in their core positions during reactor operations, or in the unlikely event of a disruptive core accident. The core holddown structure, and the upper internals of which it is an integral part, also function to guide and maintain the alignment of the various control mechanisms and instrumentations during, for example, reactor shutdown refueling operations, as well as for protecting and housing the control rods during reactor operational periods. The core holddown structure is thus positioned atop the nuclear core during normal reactor operations, however, the same must also provide accessibility to the core fuel assemblies during refueling operations of the core by the fuel handling equipment. Consequently, some desirable arrangement or dispositional scheme for the upper internals structure (UIS) must be developed whereby the various operational goals of the facility, both during normal operation and refueling, can be advantageously achieved.

The prior art attempted to resolve the aforenoted, apparently relatively diverse dispositions of the UIS within the normal operational and refueling modes of the reactor, and thereby effectively achieve the operational goals of the reactor both during the normal operations and refueling modes, by mounting the core holddown structure and its UIS upon a small plug rotatably disposed upon a larger plug. During normal reactor operations, the core holddown structure and the UIS is seated atop the nuclear core so as to completely cover the same. When refueling operations are to be commenced, however, the large plug is rotated so as to in turn rotate the small plug and the attached UIS out of position atop the nuclear core and simultaneously position a suitable refueling machine, attached to the underside of the large plug, over the core for performance of the refueling operations. As may therefore be readily appreciated, in order to accommodate that portion of the large plug, upon which the small plug and the UIS are disposed, within the reactor pressure vessel and outside of the normal boundary or shadow of the core barrel when the large plug has been rotated to its refueling mode position, the diametrical extent of the reactor pressure vessel had to be approximately twice that of the core barrel. In view of the well-known fact that the size of the reactor pressure vessel directly affects the size of the nuclear steam supply system (NSSS) containment structures or nuclear plant buildings, which of course therefore determine nuclear plant capital expenditures, the aforenoted structural arrangement or layout of the refueling system has not been a commercially acceptable or viable means of accomplishing the refueling operations within a liquid metal-cooled fast breeder reactor.

Another refueling system structural arrangement developed within the prior art involved the disposition of the core holddown structure upon the small plug in an eccentric manner whereby the core holddown structure could be rotated away from its normal position atop the nuclear core by means of rotation of the small plug. Such a structural arrangement, however, nevertheless required additional space to be provided about the periphery of the nuclear core and within the reactor pressure vessel in order to accommodate the disposition of the holddown structure when refueling operations are being performed. Consequently, the diametrical extent of the large plug was still approximately twice that of the core barrel. In addition, within this particular structural arrangement of the various system components, the UIS was split into at least two separate parts or portions, a first portion being operatively mounted connected to the small plug while the second portion was operatively connected to the large plug. Such a structural arrangement, however, was deemed undesirable from the viewpoint of efficiently carrying out the refueling operations of the plant because it was often difficult to properly align the two different UIS sections relative to each other as well as relative to the nuclear core. Still further, a split UIS is undesirable from the viewpoint of adequately withstanding earthquake shock loads because the structural integrity of a split UIS is substantially less than that of a single or integral, one-piece UIS. While further improved or modified nuclear facilities were in fact able to structurally arrange the large and small plug, and UIS, components so as to substantially reduce the size of the closure head and the diametrical extent of the large plug relative to the diametrical extent of the core barrel, these advanced facilities nevertheless still employed split UIS components which of course exhibited the aforenoted unacceptable operational and structural drawbacks. In addition, no provisions were made in connection with these refueling systems for performing the refueling operations within the reactor pressure vessel. Consequently, the refueling operations are performed externally of the reactor pressure vessel which necessitates the disposition of the fuel assemblies within massive shielded refueling machines. As may therefore be readily appreciated, such machines, as well as the special handling equipment required in conjunction therewith, were not in furtherance of the economic cost-effective goals of state-of-the-art nuclear reactor plant facilities.

A last type of conventional nuclear reactor facility refueling system likewise sought to achieve the various aforenoted operational goals characteristic of the normal operational and refueling modes of the facility, while nevertheless seeking to resolve the various aforenoted operational, structural, and economic drawbacks of other conventional systems, through the provision of a large rotary plug system wherein the refueling handling machine was mounted upon the underside of the large rotatable plug so as to be radially movable relative thereto within a radially extending slot defined within the system's UIS. Such a system, however, has likewise proven to be less than entirely satisfactory in view of the fact that a slotted UIS does not exhibit the degree of structural integrity that is desired or required in order to permit reactor facilities to adequately withstand severe shock loading or forces as may be encountered during, for example, earthquake phenomena. In addition, the provision of the radially oriented slot within the UIS for the traversal of the refueling handling machine means that the machine must actually be maneuvered between the control rod mechanisms of the reactor which is very difficult and time-consuming in view of the fact that care must be taken when moving the handling machine within the congested vicinity of the control rod mechanisms.

Accordingly, it is an object of the present invention to provide a new and improved nuclear reactor refueling system.

Another object of the present invention is to provide a new and improved nuclear reactor refueling system which is particularly characteristic of a liquid metal-cooled fast breeder reactor (LMFBR).

Still another object of the present invention is to provide a new and improved nuclear reactor refueling system which overcomes the various operational drawbacks characteristic of conventional or prior art liquid metal-cooled fast breeder reactors.

Yet another object of the present invention is to provide a new and improved nuclear reactor refueling system for a liquid metal-cooled fast breeder reactor which is especially cost-effective.

Still yet another object of the present invention is to provide a new and improved nuclear reactor refueling system for a liquid metal-cooled fast breeder reactor which facilitates the reduction in the diametrical extent or size of the closure head large plug so as to be the same as that of the core barrel.

Yet still another object of the present invention is to provide a new and improved nuclear reactor refueling system for a liquid metal-cooled fast breeder reactor which facilitates the transfer of the reactor core fuel assemblies at a station located externally of the core barrel yet physically within the reactor pressure vessel.

A further object of the present invention is to provide a new and improved nuclear reactor refueling system for a liquid metal-cooled fast breeder reactor wherein the upper internals structure (UIS) operatively associated with the reactor core has a unique structural arrangement.

A yet further object of the present invention is to provide a new and improved nuclear reactor refueling system for a liquid metal-cooled fast breeder reactor wherein the upper internals structure comprises a single or one-piece integral structure.

A still further object of the present invention is to provide a new and improved nuclear reactor refueling system for a liquid metal-cooled fast breeder reactor wherein the one-piece or integral UIS exhibits an exceedingly high degree of structural integrity.

A yet still further object of the present invention is to provide a new and improved nuclear reactor refueling system for a liquid metal-cooled fast breeder reactor wherein the UIS is capable of being disposed in its core holddown mode during normal reactor operation as well as for facilitating the disposition of the control rods within the reactor core in preparation for shutdown of the reactor for the institution of refueling operations, and in addition, the UIS is capable of being suitably moved relative to the reactor core in order to provide the requisite accessibility to the core fuel assemblies during performance of the refueling operation sequence.

A still yet further object of the present invention is to provide a new and improved nuclear reactor refueling system for a liquid metal-cooled fast breeder reactor wherein the UIS, and the reactor control rods and mechanisms operatively associated therewith, is arranged in a symmetrically balanced array relative to the reactor core.

An additional object of the present invention is to provide a new and improved nuclear reactor refueling system for a liquid metal-cooled fast breeder reactor wherein the refueling system handling machine is capable of performing the refueling operations without encountering any interference with the control rods or their mechanisms.

SUMMARY OF THE INVENTION

The foregoing and other objectives of the present invention are achieved through the provision of a new and improved nuclear reactor refueling system for a liquid metal-cooled fast breeder reactor which comprises a large plug rotatably mounted within a stationary outer ring forming part of the reactor pressure vessel closure head, the large plug being disposed eccentrically with respect to the reactor core. A small plug is, in turn, rotatably mounted within the large plug in an eccentrically disposed manner, and a fixed arm fuel handling machine is mounted upon the underside of the small plug. The fixed arm fuel handling machine projects a predetermined distance in the radial direction beyond the diametrical extent of the large plug, and in this manner, the fuel handling machine is permitted to operationally interface with a fuel transfer port located at a position which is external of the reactor core barrel yet internal of the reactor pressure vessel. In addition, the fuel handling machine is enabled to likewise operationally interface with fuel assemblies located substantially diametrically opposite the fuel transfer port, which would, in effect, be the most difficult fuel assemblies to interface with in view of the particular eccentric mounting of the large plug relative to the reactor core.

The nuclear reactor control rods are arranged in a unique six-fingered star pattern formed, in effect, by means of three intersecting rows, and the upper internals structure, within which the control rods are housed when the reactor facility is in operation, has a structural arrangement or configuration matching that of the control rods. The control rods are thus symmetrically arranged within, or relative to, the reactor core, and as a result of the finger or star arrangement of the control rods and the upper internals structure housing, a radially extending corridor is defined between two of the fingers or radially extending rows of the UIS into which the fixed arm fuel handling machine may be maneuvered during the performance of fuel handling operations. The UIS is secured to the underisde of the large plug in an eccentric manner so as to permit even the centermost fuel assemblies of the reactor core to be accessible to the fuel handling machine. In view of the symmetrically balanced structural configuration of the UIS, wherein, in particular, there is no provision of an asymmetrically located radial slot for accommodation of the fuel handling machine, the one-piece or integral UIS exhibits structural integrity far superior to those of the prior art.

BRIEF DESCRIPTION OF THE DRAWINGS

Various other objects, features, and attendant advantages of the present invention will be more fully appreciated as the same becomes better understood from the following detailed description when considered in connection with the accompanying drawing, wherein:

The sole FIGURE is a plan veiw of the new and improved nuclear reactor refueling system for a liquid metal-cooled fast breeder reactor showing the cooperative parts thereof when the reactor is in its normal operation mode.

DESCRIPTION OF THE PREFERRED EMBODIMENT

Referring now to the drawing, there is shown the new and improved nuclear reactor refueling system constructed in accordance with the present invention and generally indicated by the reference character 10. The nuclear reactor core 12, shown only in part, comprises a circular array of fuel assemblies 14 disposed within a circular core barrel 16, and as is conventional, the core barrel 16 is, in turn, disposed within the nuclear reactor pressure vessel 17. As is additionally conventional in connection with liquid metal-cooled fast breeder reactors, there is also provided a large plug 18 which is rotatably disposed, by suitable means not shown, in an eccentric manner relative to the reactor core 12 and the core barrel 16. In particular, the geometrical center of the reactor core 12 and core barrel 16 is designated at 20 while the geometrical center, and the center of rotation, of the large circular plug 18 is designated at 22. The large circular plug 18 is rotatably disposed within a stationary outer ring or deck 19 which forms part of the nuclear reactor closure head.

In accordance with the particular features of the present invention, a small circular plug 24 is rotatably mounted within the large circular plug 18 so as to be rotatable independently thereof and relative thereto. It is to be noted at this juncture that while the circular plugs 18 and 24, and the deck 19, are of course fabricated from materials which render the same visually opaque, they have been illustrated as being transparent solely for clarity purposes. The small circular plug 24 is of corse seen to be eccentrically mounted with respect to the large circular plug 18, and the geometrical center, and center of rotation, of small circular plug 24 is denoted at 26. A fuel handling machine 28 is rotatably mounted upon the underside of the small circular plug 24 by means of a fixed arm 29 with the rotational axis of the fuel handling machine arm 29 being radially offset from the center 26 of plug 24, as denoted at 30. The fixed arm fuel handling machine 28 can thus rotate relative to small circular plug 24 about its arm axis 30, and in addition, in view of the rotational movement capable of being achieved by means of plug 24, the movement of the handling machine arm axis 30 can be denoted by the circular locus 32. A further compound movement of the fuel handling machine 28 is of course appreciated as being capable of being achieved as a result of the rotational movement of the large plug 18. Still further, it is seen from the Figure that when the fuel handling machine 28 is disposed in the illustrated position, the same extends radially outwardly beyond the diametrical extent of the large circular plug 18, and in this manner, the machine 28 can in fact operationally interface with a fuel transfer port or station schematically designated at 34 at which fresh core fuel assemblies may be grasped for subsequent transportation to, and deposition into, the reactor core 12, or alternatively, spent core fuel assemblies which are to be removed from the core 12 may be discharged for subsequent transportation to a spent fuel receiving means, schematically shown at 35. It is to be particularly noted that the fuel transfer port or station 34 and spent fuel receiving means 35 are located at a position externally of the reactor core barrel 16 yet internally within the reactor pressure vessel 17, and this is in fact able to be achieved in accordance with the present invention as a result of the eccentric mounting of the large circular plug 18 within the reactor pressure vessel 17 relative to the reactor core 12 and the core barrel 16. In addition, it is lastly noted in connection with the rotatable mounting of the fixed arm fuel handling machine 28 upon the small rotatable plug 24 that when the fixed arm fuel handling machine 28 is rotated about its arm axis 30 so as to be disposed in a radially inwardly extending direction diametrically opposite that illustrated in the Figure, the entire handling machine 28 may be readily removed from the large plug 18 in conjunction with removal of the small plug 24 from large plug 18 as a result of the fact that the machine 28 and arm 29 will both be disposed entirely beneath the small plug 24. In this manner, servicing, for example, of the fuel handling machine 28 is facilitated.

Continuing further, another unique feature of the present invention comprises the disposition or arrangement of the reactor core control rods and the upper internals structure operatively associated therewith within which the control rods are physically disposed during operation of the reactor facility. In particular, it is seen that the reactor core 12 has eighteen control rods C operatively associated therewith, wherein the control rods C are disposed within three intersecting rows. The array of control rods C therefore defines a six-fingered star arrangement with three control rods C disposed within each figner section of the star array. The control rods C are of course elevationally controlled by suitable drive mechanisms, not shown, so as to be disposed in a lowered mode during reactor core shutdown and fuel transfer operations, and elevationally raised to positions above the reactor core 12 when the reactor facility is in normal operation. A combination core holddown and upper internals structure 36 is fixedly secured to the underside of the large circular plug 18, the upper internals structure (UIS), in addition to serving its core holddown functions, serving to house the control rods C when the same are raised to their elevated mode so as to permit normal operation of the reactor facility. In view of this function, it is seen that the UIS 36 has a configuration matching that of the arrangement of the control rods C, that is, UIS 36 has the configuration of a six-fingered star. The center of the UIS 36 coincides with the center 20 of the reactor core 12 and core barrel 16 when the large circular plug 18 is disposed in its illustrated position which corresponds to the normal operational mode of the reactor facility. In this manner, the UIS 36 can symmetrically perform its holddown function relative to core 12 and the fuel assemblies 14 disposed therein, and when refueling operations are to be performed, the control rods C may be lowered from their housing tubes 38 defined within UIS 36 down into the core 12. The control rods C are thus symmetrically disposed throughout the core 12. When the control rods C are lowered into the core 12 from their UIS housing tubes 38, the rods C may be subsequently disconnected from their drive mechanisms within the plane defined between the undersurface of the UIS 36 and the core 12 whereby the UIS 36 and the large circular plug 18 to which the UIS 36 is fixedly secured may then be rotated to various appropriate positions in furtherance of the refueling and transfer operations to be performed by the fixed arm fuel handling machine 28. During normal reactor operation, it is noted from the Figure that the fuel handling machine 28 is disposed at the fuel transfer station 34 so as not to be subjected to the deleterious effects of the reactor liquid metal coolant.

With respect to the particular parameters and procedures accompanying the refueling operations, it is noted that the radially innermost reach or access point of the fuel handling machine 28 will comprise a distance, as measured from the illustrated location of handling machine arm axis 30, of the diameter of the handling machine axis locus 32 plus the lineal distance defined between handling machine arm axis 30 and the center of the fuel handling machine 28 when, for example, the small plug 24 is rotated 180° from its illustrated position. This radially innermost reach or access point of the fixed arm fuel handling machine 28 then defines a circular locus 40 when the small circular plug 24, fuel handling machine 28, and large circular plug 18 are all rotated 360° in unison and with no relative rotation effectuated between the small and large plugs. The center of the just-defined circular locus 40 will of course also represent the geometrical center and center of rotation 22 of the large plug, and of course, the radial distance defined between the center 20 of core 12 and core barrel 16, and the center 22 of large plug 18, defines the degree of eccentricity between the large plug 18 and the core 12 or core barrel 16. In view of this eccentric mounting of the large plug 18 relative to the core 12, it will now be clearly appreciated that as the large plug 18 rotates about its center 22, the UIS 36 will rotate with large plug 18 and thereby uncover, and provide access to, the centermost core fuel assemblies 14 for servicing by means of the fuel handling machine 28. While the fixed arm fuel handling machine 28 does not move radially pe se relative to its small circular plug 24, or large circular plug 18, radial movement of the fuel handling machine 28 can nevertheless be effected relative to core 12 through compound rotational movement of the small plug 24 and rotational movement of the fixed arm fuel handling machine 28 about its own arm axis 30. In this manner, as a result of rotational movement of the large plug 18 about its axis, all areas of the reactor core, and the fuel assemblies 14 contained therein, can be accessed by machine 28.

Thus it may be seen that by means of the present invention, important improvements within a liquid metal-cooled fast breeder reactor have been effected as compared to prior art liquid metal-cooled fact breeder reactors. By means of the eccentric mounting of the large plug 18 upon the reactor pressure vessel closure head or deck 19, and relative to the core 12 and core barrel 16, as well as the provision of the small rotatable plug 24 eccentrically mounted, in turn, upon the large rotatable plug 18, the diametrical size or extent of the large rotatable plug 18 has been able to be reduced from that characteristic of prior art large rotatable plugs, which have characteristically been approximately twice the diametrical extent of the core barrel, to such an extent that it is able to precisely match that of, or be equal to, the diametrical extent of the reactor core barrel 16. In addition, the eccentric disposition of the large plug 18 relative to the core barrel 16, as well as the eccentric disposition of the small circular plug 24 relative to the large circular plug 18, facilitates the location of the fuel transfer station 34 at a point which is external of the core barrel 16 yet internal of the nuclear reactor pressure vessel 17. In this manner, the fuel assemblies 14 need not be encased within heavily shielded refueling machines as is sometimes conventionally required, in view of the fact that our fuel transfer operations occur internally of the reactor pressure vessel 17. Still further, the eccentric mountings of the large and small plugs 18 and 24, respectively, as well as the eccentric mounting of the fuel handling machine 28 relative to small plug 24, permits access to all areas and fuel assemblies 14 of the reactor core 12 including the most difficult to access fuel assembly locations which may be recognized to be those located diametrically opposite the illustrated position of the fuel transfer port 34, or in other words, in the southwestern part of the core 12 as illustrated in the Figure at 14'.

It is additionally appreciated that as a result of the eccentric disposition of the small rotatable plug 24 upon the large rotatable plug 18, sufficient clearance between the small plug 24 and the UIS 36 is established. Still further, the fingered arrangement of the control rods C, and therefore the structural configuration of the UIS 36, automatically defines a radially extending corridor between the two star fingers 42 and 44 of the UIS 36 within which the fixed arm fuel handling machine 28 can be maneuvered for performance of its refueling operations. In addition, as the control rods C and their associated drive mechanisms, not shown, but including housing tubes 38, are all housed within the UIS 36, not interference is encountered between the fuel handling machine 28 and the control rods C or their drive mechanisms, not shown. Still further, it is noted that the radially extending corridor defined between UIS fingers 42 and 44 has been defined in such a manner that the same is symmetricaly provided within, or relative to, the UIS 36 as opposed to defining a special radially extending slot, in an asymetric manner, within the UIS as is characteristic of the prior art systems. In this manner, a balanced array of control rods C is provided about core 12, and more importantly, a single-piece or integral UIS 36 is provided which exhibits enhanced structural integrity as compared to conventional upper internals structures. In a similar manner, it is noted that all of the control rods C are disposed within the single-piece UIS 36, no control rods are disposed within the small rotatable plug 24, and the small rotatable plug structure 24 is entirely independent of the UIS 36. Consequently, the present invention has again achieved a UIS 36 which exhibits superior structural integrity as compared to conventional split upper internals structures, and alignment problems characteristic of such dual upper internals structures and their housed control rods, relative to the reactor cores, has been able to be eliminated. It is also noted that as a result of the particular configuration of the UIS 36, and its eccentric mounting relative to the core 12 because of its mounting upon large plug 18, the UIS 36 never moves beyond the shadow or envelope of the core barrel 16 thereby, again, facilitating the reduction in diametrical extent or size of the refueling system relative to the core 12 and core barrel 16.

As a specific example, for a reactor which has an output of 3,800 MW(T) and 1,490 MW(e), the diameter of the reactor vessel 17 is 29 feet 7 inches (9.02 m), and the diameter of the large plug 18 and core barrel 16 are both 19 feet 10 inches (6.05 m). The geometric center 20 of the core barrel 16 is spaced a first predetermined distance of 27.388 inches (69.56 cm) from the geometric center 22 of the large plug 18. The small plug 24 has a diameter of 67.0 inches (170.18 cm) and the center of rotation 26 of the small plug 24 is offset a second predetermined distance of 67.367 inches (171.11 cm) from the rotational center 22 of the large plug 18. The fuel handling arm 29 is rotatable on the small plug 24 with the center of rotation of the handling arm 29 offset a third predetermined distance of 21.31 inches (54.14 cm) from the rotational center 26 of the small plug 24. The length of the fuel handling arm measured from the center of rotation thereof to the center of the fuel transfer means is 42.629 inches (108.28 cm).

Obviously, many modifications and variations of the present invention are possible in light of the above teachings. For example, while the relative sizes of the small rotatable plug 24 and the fixed arm fuel handling machine arm 29 may be altered so as to effectively achieve the same reach or access to the fuel assemblies 14 of the core 12, it is not desirable to make the small plug 24 substantially smaller than illustrated, and make the handling machine arm 29 correspondingly larger, because one would then reach the size limit whereby the machine 28 and arm 29 could be entirely disposed beneath the small plug 24 in order to remove the machine 28 along with the plug 24 from large plug 28 for servicing or maintenance of the machine 28. Similarly, to make the small plug 24 appreciably larger would then result in interference with the UIS 36. It is therefore to be understood that within the scope of the appended claims, the present invention may be practiced otherwise than as specifically described herein.

I claim:

1. In combination with a liquid-metal fastbreeder nuclear reactor comprising a reactor pressure vessel and closure head therefor, a reactor core barrel disposed within said reactor vessel and enclosing a reactor core having therein a large number of closely spaced fuel assemblies, and said reactor core barrel and said reactor core having an approximately concentric circular cross-sectional configuration with a geometric center in predetermined location within said reactor vessel, the improved refueling system comprising:

a large controllably rotatable plug means comprising the substantial portion of said closure head, a reactor upper internals structure mounted from said large rotatable plug means, said large rotatable plug means having an approximately circular configuration which approximates the cross-sectional configuration of said reactor core barrel with a center of rotation positioned a first predetermined distance from the geometric center of said reactor core barrel so that said large rotatable plug means rotates eccentrically with respect to said reactor core barrel;

a small controllably rotatable plug means affixed to said large rotatable plug means and rotatable with respect thereto, said small rotatable plug means having a center of rotation which is offset a second predetermined distance from the rotational center of said large rotatable plug means so that said small rotatable plug means rotates eccentrically with respect to said large rotatable plug means;

fuel handling arm means of predetermined length rotatably affixed at one end to said small plug means and controllably rotatable about said one end thereof with respect to said small rotatable plug means with the center of rotation of said fuel arm handling means offset a third predetermined distance from the rotational center of said small plug means, and fuel transfer means affixed to said fuel arm handling means proximate the other end of said fuel arm handling means;

fuel transfer port means and spent fuel receiving means positioned in predetermined location within said reactor pressure vessel and exteriorly of said reactor core barrel, said fuel transfer port means operable to provide fresh fuel assemblies, and said spent fuel receiving means operable to receive spent fuel assemblies;

the predetermined dimensions and component positioning of said refueling system being such that when the rotational centers of said large plug means and said small plug means are on the same side with respect to the geometric center of said reactor core barrel and said fuel handling arm means is rotated to point generally away from the rotational center of said large plug means, said fuel transfer means can be positioned over said fuel transfer port means and said spent fuel receiving means; when the rotational centers of said large plug means and said small plug means are aligned with the geometric center of said reactor core barrel and on opposite sides thereof and said fuel handling arm means is rotated to point away from the geometric center of said reactor core barrel, said fuel transfer means extends at least over that individual fuel assembly which is positioned at the periphery of said reactor core; and the predetermined dimensions of said refueling system being such that by controlling the rotation of said large plug means and said small plug means and said fuel handling arm means, said fuel transfer means can be positioned over any of said individual fuel assemblies for replacement of the same.

2. The improved refueling system as specified in claim 1, wherein:

said reactor upper internals structure is eccentrically mounted on said large rotatable plug means to enable said upper internals structure to be concentrically disposed during refueling operations with respect to said reactor core, said upper internals structure having a six-fingered radially extending star configuration, the center of rotation of said large rotatable plug means positioned between two adjacent fingers of said starconfigured upper internals structure, and an access corridor provided between said two adjacent fingers of said star-configured upper internals structure to provide access by said fuel transfer means to all of the fuel assemblies of said reactor core.

3. The improved refueling system as specified in claim 1, wherein:

the distance from the center of rotation of said small plug means to said fuel handling means is approximately equal to the distance from the center of rotation of said large plug means to the center of rotation of said small plug means, and said fuel transfer means can extend beyond the periphery of said large plug means for a distance which is approximately equal to that distance measured from the center of rotation of said large plug means to the geometric center of said reactor core barrel.

* * * * *